United States Patent [19]

Florian

[11] 3,866,162
[45] Feb. 11, 1975

[54] GEOPHONE TAKEOUT ASSEMBLY FOR SEISMIC CABLES
[75] Inventor: Eugene F. Florian, Houston, Tex.
[73] Assignee: Mark Products, Inc., Houston, Tex.
[22] Filed: Mar. 15, 1973
[21] Appl. No.: 341,505

[52] U.S. Cl. .................... 340/17, 340/3 T, 340/85, 174/54
[51] Int. Cl. ......................... G01s 9/66, G01v 1/16
[58] Field of Search .......... 340/7 R, 3 T, 85, 15, 17; 174/50, 54, 65; 339/151 C

[56] References Cited
UNITED STATES PATENTS

| | | | |
|---|---|---|---|
| 2,423,591 | 7/1947 | Flude | 340/7 R |
| 2,568,851 | 9/1951 | Flude | 340/7 R |
| 2,581,994 | 1/1952 | Winterhalter | 340/7 R |
| 2,654,077 | 9/1953 | McLoad | 340/7 R |
| 3,435,410 | 3/1969 | Babb | 340/7 R |
| 3,445,809 | 5/1969 | McLoad | 340/17 |

Primary Examiner—Maynard R. Wilbur
Assistant Examiner—N. Moskowitz
Attorney, Agent, or Firm—Bargfrede and Thompson

[57] ABSTRACT

A geophone is connected to the electrical conductors of a seismic cable by a takeout cable connected between the conductors and the geophone. A housing encloses the connection between the takeout cable and the conductors of the seismic cable and also a portion of the takeout cable for any of the tensile load imposed on the takeout cable to be transmitted to the housing. The housing, in turn, is connected to the tensile member of the seismic cable so that any forces transmitted to the housing through the takeout cable is transmitted to the tensile member of the seismic cable.

5 Claims, 5 Drawing Figures

PATENTED FEB 11 1975  3,866,162

GEOPHONE TAKEOUT ASSEMBLY FOR SEISMIC CABLES

This invention relates to seismic cable assemblies, generally, and in particular to the takeout connection between a geophone and the seismic cable.

A seismic cable, usually, is made up of a plurality or bundle of electrical conductors, with each conductor electrically insulated from the other. The bundle is insulated from the outside by an outer sheath of insulating material. If the cable is going to be subjected to a tensile load, an elongated member of high tensile strength is incorporated in the cable to relieve the conductors and the outer sheath of this load. Such a construction is used, for example, where the cable assembly is to be drug along the ground from position to position while taking a seismic survey, as described in U.S. Pat. application Ser. No. 212,267, filed Dec. 27, 1971, entitled "Seismic Cable Assembly", and assigned to the same assignee as this application.

In a conventional takeout connection for geophones, the conductors of the takeout cable are connected to the conductors in the seismic cable. The takeout cable is also anchored in some way to the outer sheath so that the pull of the geophone will be taken by the outer sheath of the cable. Where the geophones are picked up manually along with the cable and moved from location to location, this arrangement is satisfactory, as no undue loads are placed on the connection between the geophone and the seismic cable. Where the cable is pulled along the ground from time to time, the geophones occasionally hang on something on the ground and break their connection with the seismic cable. Also, when working on snow or ice, a geophone may freeze in position and the force required to break it loose, if applied through the takeout, has caused this connection to be broken. Usually, just the electrical connection between the geophone and the seismic cable is broken. This results because the pull of the geophone is transmitted to the outer sheath of the cable. If the load causes the sheath to give, the electrical connection between the takeout cable and the conductors in the seismic cable will be stressed and often broken.

It is an object of this invention to provide a geophone takeout assembly that will transmit the load imposed on the takeout cable by the geophone directly to the tensile member of the seismic cable to relieve the outer sheath of the seismic cable from the load.

It is a further object of this invention to provide a geophone takeout assembly that will transmit the pull of a geophone directly to the tensile member of a seismic cable that can be assembled quickly and easily in the field.

It is another object of this invention to provide a geophone takeout assembly having a housing that encloses the electrical connection between the geophone takeout cable and the conductors of the seismic cable and that transmits the load imposed on the cable by the geophone to the tensile member of the seismic cable.

These and other objects, advantages, and features of this invention will be apparent to those skilled in the art from a consideration of this specification, including the attached drawings and appended claims.

Figure 3:
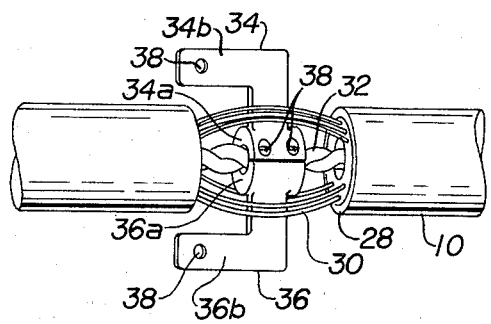
Figure 4:
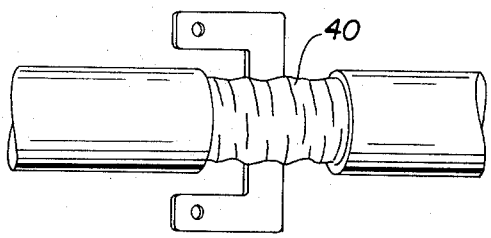
Figure 5:
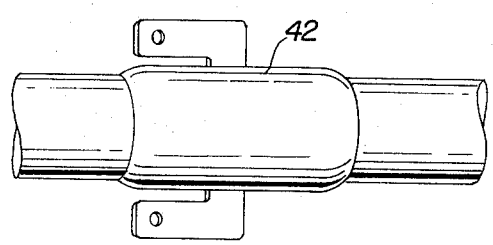

FIGS. 3, 4, and 5 are views in elevation of the steps of connecting the load transmitting member of the geophone takeout assembly of this invention to the tensile member of a seismic cable.

Figure 1:
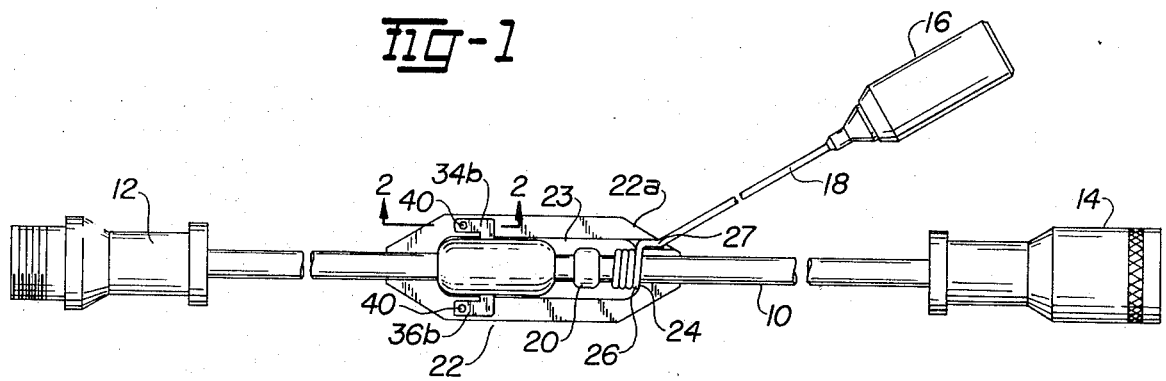
FIG. 1 is a view, partially in section and partially in elevation, of the preferred embodiment of the geophone takeout assembly of this invention.
Figure 2:
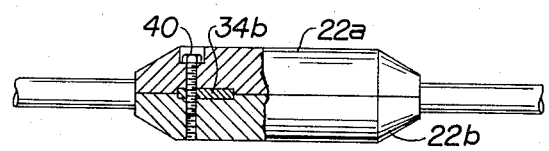
FIG. 2 is a view taken along line 2—2 of FIG. 1.

Usually, a seismic cable assembly will include a plurality of sections of seismic cable, such as cable section 10 of FIG. 1, that are connected together to make up the entire seismic cable assembly. Connectors 12 and 14 attached to the ends of seismic cable section 10 are for this purpose. Usually, each section 10 of the seismic cable will have a plurality of geophones connected to it. In FIG. 1, only one geophone is shown to illustrate the invention.

As shown, geophone 16 is connected physically and electrically to cable section 10 through takeout cable 18. The takeout cable includes electrical conductors enclosed in an outer sheath of insulating material. One end of the outer sheath of the cable is physically connected to the geophone and its conductors are electrically connected to the geophone in the conventional manner. The other ends of its conductors are electrically connected to selected conductors of seismic cable section 10 inside body 20 of insulation. This can be done in several ways. Commonly, the outer sheath of the seismic cable is cut away exposing the desired electrical conductors. The conductors of takeout cable 18 are electrically connected to these conductors. The exposed conductors are enclosed in body 20 of insulating material.

The connection between the seismic cable and the takeout cable is enclosed in housing 22 to provide a protective covering to the connection to protect it as it is drug along the ground, snow, or ice, as the case may be. In accordance with this invention, a portion of the takeout cable is also enclosed by the housing for any tensile load on the takeout cable to be transmitted to the housing. In the embodiment shown, housing 22 is split longitudinally to provide two symmetrical halves 22a and 22b. Each half of the housing has a longitudinal groove, such as groove 23 of half 22a of FIG. 1. The grooves combine when the housing is assembled to provide a cavity to receive body 20 of insulating material and the wraps of the takeout cable adjacent thereto. The end portions of the grooves, such as portions 25a and 25b of groove 23, are of less width to form an opening when the housing is assembled having a diameter about equal to the seismic cable. This provides annular shoulder 24 to abut the last wrap 26 of the takeout cable. Any pull on the takeout cable will be transmitted to housing 22 through the engagement of shoulder 24 and wrap 26.

Each half of the housing has mating grooves, such as groove 27, that combine to provide an opening through which the takeout cable leads out of the housing. These grooves could be designed to have an opening slightly less in diameter than the takeout cable so the cable will be clamped between two halves of the housing when assembled to cause the pull of the cable to be transmitted to the housing.

The structure of seismic cable section 10 is shown in FIG. 3 where outer sheath 28 is cut away. It includes conductors 30 and tensile member 32. Usually, in this type cable construction, the conductors spiral around the central tensile member. In FIG. 3, the two portions of the cable have been rotated relatively to bring the conductors to a position more parallel with the tensile member for purposes to be described below. Tensile member 32 is usually a stranded steel cable designed to take the load of pulling a substantially long seismic cable assembly along the ground.

In accordance with this invention, means are provided to connect the housing to the tensile member of the seismic cable to transmit any forces imposed on the housing by the takeout cable to the tensile member of the seismic cable. In the embodiment shown, this includes load transferring members 34 and 36 that are designed to be connected together to clamp tensile member 32 therebetween. As shown, each member has a semicircular hub 34a and 36a. Each hub has a semicircular groove which combine when the two members are brought together to receive tensile member 32. Hub 34a has holes drilled therethrough through which screws 38 extend into tapped holes (not shown) in hub 36a to connect the two hub sections together around the tensile member. As shown in FIG. 3, only two of the screws can be seen. There are a similar pair on the other side of hub 34a. Preferably, the grooves in the hubs are designed to prevent the two hubs from contacting each other when in position on the tensile member so that the clamping action of the hubs on the tensile member will depend strictly on the stress placed in anchoring screws 38.

To anchor or connect the hubs to the housing, each hub is provided with L-shaped radially extending arms 34b and 36b, respectively. Each arm is provided with opening 38, which is positioned, as shown in FIG. 1, so that when the two sections or halves of housing 22 are brought together around the takeout connection, openings 38 in the two arms will be positioned for housing screw 40 to extend through the openings and to not only connect the two halves of the housing together, but also to anchor the housing to arms 34b and 36b, respectively. Thus assembled, any tensile load placed on the housing tending to move it longitudinally of seismic cable 10 will be transmitted directly to tensile member 32 of the cable through L-shaped arms 34b and 36b and hubs 34a and 36a.

FIGS. 3, 4, and 5 show the preferred manner of connecting the load transferring members to the tensile member of a seismic cable. The first step is shown in FIG. 3, where the outer sheath of cable 10 has been cut away for the required distance. The two sections of the cable are then rotated in the direction required to unwind conductors 30 so that they are more or less parallel with tensile member 32. This allows the hub portions of the two members to be moved through the conductors into position around tensile member 32. After the members have been clamped to the tensile member, the exposed area of the cable between the ends of the outer sheath is wrapped with insulating tape 40, as shown in FIG. 4. Then body 42 of insulating material is shaped to seal the space between the outer sheath, as shown in FIG. 5. When this is finished, takeout cable 18 can be electrically connected to the cable and the necessary number of wraps made of the cable around the seismic cable, as shown in FIG. 1. Then, when housing 22 is assembled to enclose the anchor member, as well as the wraps of takeout cable, the geophone will be connected to the seismic cable so that any tensile load thereon will be transmitted directly to the tensile member of the cable.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. A geophone takeout assembly for connecting a geophone to a seismic cable having one or more conductors, a tensile member to take any tensile load on the cable, and an outer sheath of insulating material, said assembly comprising a takeout cable electrically connected between the conductors of the seismic cable and the geophone, a housing enclosing the electrical connection and a portion of the takeout cable for any tensile load imposed on the takeout cable by the geophone to be transmitted to the housing, and means connecting the housing to the tensile member of the seismic cable to transmit any forces imposed on the housing by the takeout cable to the tensile member of the seismic cable.

2. The assembly of claim 1 in which the housing is split longitudinally into two sections and the means connecting the housing to the tensile member includes two members, means for connecting the two members to clamp the tensile member therebetween to anchor the members to the tensile member, and a radially extending arm attached to one of said members for connecting to the housing.

3. The assembly of claim 1 in which the takeout cable is wrapped around the outer sheath of the seismic cable inside the housing with the end wrap in engagement with the housing.

4. A geophone takeout assembly for electrically and physically connecting a geophone to a seismic cable having one or more conductors, a tensile member for pulling the cable along the ground, and an outer sheath of insulating material, said assembly comprising a takeout cable electrically connected between the conductors of the seismic cable and the geophone, said takeout cable having a portion wrapped around the outer sheath of the seismic cable, a housing enclosing the electrical connection and the portion of the takeout cable wrapped around the seismic cable for any tensile load imposed on the takeout cable to be transmitted to the housing, and means connecting the housing to the tensile member of the seismic cable to transmit any forces imposed on the housing by the takeout cable to the tensile member of the seismic cable.

5. The assembly of claim 4 in which the housing is split longitudinally into two sections and the means connecting the housing to the tensile member includes two members, means for connecting the two members to clamp the tensile member therebetween to anchor the members to the tensile member, and a radially extending arm attached to one of said members for positioning between the two sections of the housing to connect the housing to the tensile member.

* * * * *